United States Patent
Li et al.

(10) Patent No.: US 8,125,884 B1
(45) Date of Patent: Feb. 28, 2012

(54) APPARATUS FOR PRE-CODING USING MULTIPLE CODEBOOKS AND ASSOCIATED METHODS

(75) Inventors: Yu-Ngok Li, Mountain View, CA (US); Raphael Cendrillon, Kennedy Town (HK)

(73) Assignee: Marvell International Ltd., Hamilton (BM)

( * ) Notice: Subject to any disclaimer, the term of this patent is extended or adjusted under 35 U.S.C. 154(b) by 841 days.

(21) Appl. No.: 12/170,649

(22) Filed: Jul. 10, 2008

Related U.S. Application Data

(60) Provisional application No. 60/949,134, filed on Jul. 11, 2007.

(51) Int. Cl.
H04J 11/00 (2006.01)
H04W 4/00 (2009.01)
H04B 7/216 (2006.01)
H04L 27/28 (2006.01)

(52) U.S. Cl. ........ 370/203; 375/260; 370/328; 370/342; 370/441

(58) Field of Classification Search .......... 370/203–209, 370/335, 342, 441; 375/260–265
See application file for complete search history.

(56) References Cited

U.S. PATENT DOCUMENTS

| 7,428,406 | B2 * | 9/2008 | Raaf ........................ 455/63.4 |
| 7,675,988 | B2 * | 3/2010 | Kim et al. .................... 375/267 |
| 7,680,125 | B2 * | 3/2010 | Hosein et al. ............ 370/395.4 |
| 2008/0292013 | A1 * | 11/2008 | Varadarajan et al. ......... 375/260 |
| 2009/0185577 | A1 * | 7/2009 | Kishiyama et al. .......... 370/465 |
| 2009/0209264 | A1 * | 8/2009 | Yang et al. ................ 455/452.1 |
| 2010/0232525 | A1 * | 9/2010 | Xia et al. ..................... 375/259 |
| 2010/0284359 | A1 * | 11/2010 | Kim et al. .................... 370/329 |
| 2010/0322176 | A1 * | 12/2010 | Chen et al. ................... 370/329 |
| 2011/0032839 | A1 * | 2/2011 | Chen et al. ................... 370/252 |
| 2011/0170638 | A1 * | 7/2011 | Yuan et al. ................... 375/340 |
| 2011/0243079 | A1 * | 10/2011 | Chen et al. ................... 370/329 |
| 2011/0243207 | A1 * | 10/2011 | Tang et al. ................... 375/224 |

OTHER PUBLICATIONS

Hybrid ARQ Transmission and Combining for MIMO Systems; Eko N. Onggosanusi, Anand G. Dabak, Mobile Wireless Branch DSPS R & D Center, Texas Instruments Inc., Dallas, TX 75243; Yan Hui, Gibong Jeong, San Diego Wireless Center, Texas Instruments Inc., San Diego, CA 92121; 2003 IEEE; pp. 3205-3209.

* cited by examiner

Primary Examiner — Thai Hoang

(57) ABSTRACT

A communication system includes a transmitter. The transmitter transmits information by using a plurality of pre-coding codebooks.

14 Claims, 7 Drawing Sheets

| Time-Slot 1 | Time-Slot 2 | ... | Time-Slot K | Time-Slot K+1 | ... |
|---|---|---|---|---|---|
| Use Codebook 1 | Use Codebook 2 | ... | Use Codebook K | Use Codebook 1 | ... |

FIG. 6

| Frequency 1 | Frequency 2 | ... | Frequency K | Frequency K+1 | ... |
|---|---|---|---|---|---|
| Use Codebook 1 | Use Codebook 2 | ... | Use Codebook K | Use Codebook 1 | ... |

FIG. 7

APPARATUS FOR PRE-CODING USING MULTIPLE CODEBOOKS AND ASSOCIATED METHODS

CROSS-REFERENCE TO RELATED APPLICATIONS

This application claims priority to, and incorporates by reference, U.S. Provisional Patent Application Ser. No. 60/949,134, filed on Jul. 11, 2007, titled "Precoding Using Alternating Codebooks,".

TECHNICAL FIELD

The disclosed concepts relate generally to electronic communication and, more particularly, to apparatus and methods for using multiple pre-coding codebooks in wireless communication systems.

BACKGROUND

A cellular communication system includes a base station and at least one mobile device. The base station and the mobile device communicate using a radio-frequency (RF) link. Specifically, the base station transmits RF signals to the mobile device through a downlink, and the mobile device receives those RF signals. Conversely, the mobile device transmits RF signals to the base station, and the base station receives those signals via an uplink.

The base station in a conventional cellular system typically employs multiple antennas. Using the multiple antennas, the base station can use a technique called beam-forming. Beam-forming allows the base station to transmit a spatially directional RF signal to the mobile device.

SUMMARY

The disclosed concepts provide apparatus and methods for improving electronic communication and, more specifically, for using multiple pre-coding codebooks in cellular or wireless communication systems. In one exemplary embodiment, a communication system includes a transmitter that transmits information, and a receiver that receives the information. The transmitter and the receiver use a plurality of pre-coding codebooks.

In another exemplary embodiment, a wireless cellular system includes a mobile device, and a base station. The base station transmits information to the mobile device using a downlink channel. The base station uses a plurality of pre-coding codebooks to transmit information to the mobile receiver.

In yet another exemplary embodiment, a method of communicating information via a communication channel includes transmitting information by using a pre-defined pattern of multiple pre-coding codebooks. The method further includes receiving information by using the pre-defined pattern of multiple pre-coding codebooks.

BRIEF DESCRIPTION OF THE DRAWINGS

The appended drawings illustrate only exemplary embodiments and therefore should not be considered as limiting its scope. Persons of ordinary skill in the art who have the benefit of this disclosure appreciate that the disclosed concepts lend themselves to other equally effective embodiments. In the drawings, the same numeral designators used in more than one drawing denote the same, similar, or equivalent functionality, components, or blocks.

FIG. 6 depicts a diagram of using a plurality of codebooks in multiple time-slots according to an exemplary embodiment.

FIG. 7 depicts a diagram of using a plurality of codebooks in conjunction with multiple frequencies according to an exemplary embodiment.

DETAILED DESCRIPTION

The disclosed concepts relate generally to improving electronic communication. More specifically, the disclosed concepts provide apparatus and methods for using multiple pre-coding codebooks in cellular or wireless communication systems.

Figure 1:
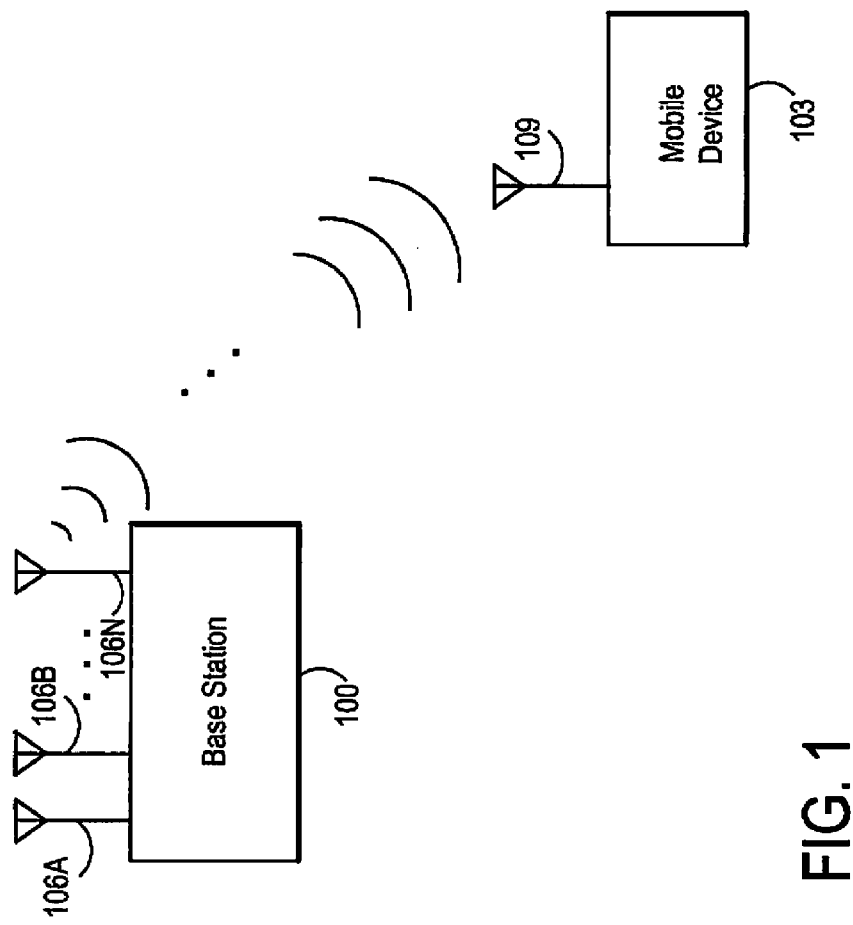
FIG. 1 illustrates a wireless communication system according to an exemplary embodiment.

FIG. 1 illustrates a wireless communication system according to an exemplary embodiment. The communication system includes base station 100 and mobile device 103. The communication system may take many forms, as desired, including a cellular communication system. For example, although the description of illustrative embodiments may refer to base stations and mobile devices, the concepts apply generally to transmitters and receivers and/or a pair of transceivers.

Furthermore, the communication system may employ a variety of communication protocols, as desired. Examples of such communication protocols include time division multiple access (TDMA), global system for mobile communications (GSM), etc.

Base station 100 can communicate with mobile device 103 via a downlink and an uplink. The uplink allows mobile device 103 to transmit or communicate information to base station 100 via antenna 109. Conversely, the downlink provides a mechanism for base station 100 to transmit or communicate information to mobile device 103, which mobile device 103 receives via antenna 109.

Base station 100 employs multiple antennas 106A-106N, where N denotes a positive integer. The use of multiple antennas allows base station 100 to apply beam-forming to transmissions (e.g., transmissions to mobile device 103 via the downlink).

To apply beam-forming, base station 100 multiplies the signal intended for transmission to mobile receiver 103, s, by a pre-coding vector, a, to produce a vector x, given by:

$$x = as.$$

Base station 100 transmits vector x to mobile device 103 via a communication channel. Note that x constitutes a vector of length N, where N denotes the number of transmit antennas at base station 100. Note further that the nth element of matrix x contains the signal transmitted by antenna n of base station 100.

The vector a forms a beam that directs the signal intended for mobile device 103 into a particular angular direction. If one has knowledge of the communication channel, h, from base station 100 to mobile device 103, one may express the optimal design for the pre-coding vector as:

$$a = h^H,$$

where $h^H$ denotes the Hermitian transpose of h.

A pre-coder as described above directs the angle of departure of the transmission beam from an antenna of base station 100 towards the location of mobile device 103. By doing so, the pre-coder helps to ensure that mobile device 103 receives a relatively strong signal. Thus, the use of a pre-coder improves the communication between base station 100 and mobile device 103.

Figure 2:
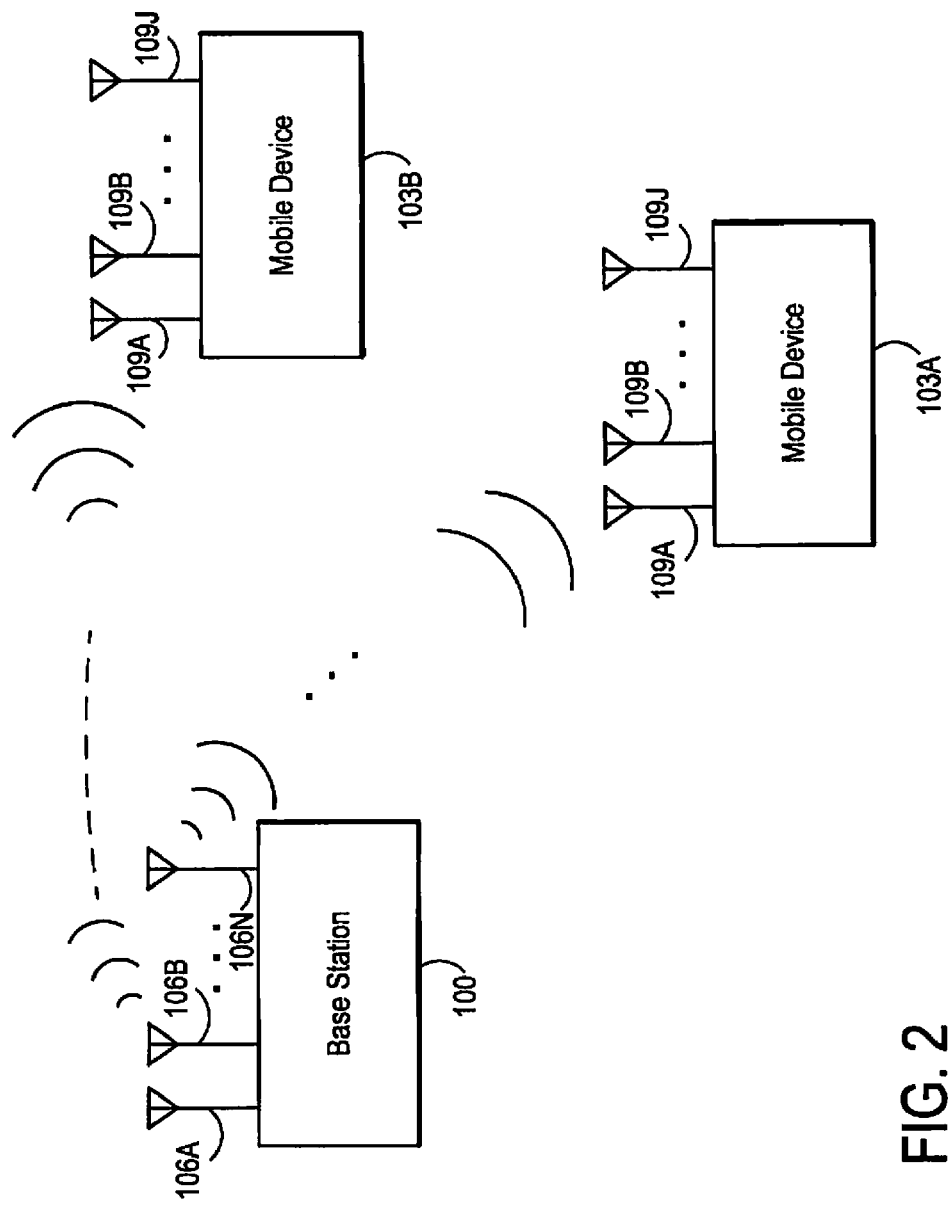
FIG. 2 depicts another wireless communication system according to an exemplary embodiment.

In practice, the base station and the mobile device might have a variety of configurations. For example, the mobile device may have multiple antennas, as the exemplary embodiment in FIG. 2 illustrates. The wireless communication system of FIG. 2 includes base station 100, with antennas 106A-106N, mobile device 103A, and mobile device 103B. (Note that designations "A" and "B" merely seek to differentiate between the two mobile devices 103A and 103B. Thus, mobile devices 103A and 103B may have the same structure and properties, or they may differ from each other. Furthermore, mobile devices 103A and 103B may the same structure as mobile device 103 (e.g., with one antenna 109), or mobile devices 103A and 103B may have multiple antennas 109A-109J (as shown in FIG. 2).

Base station 100 can communicate with mobile device 103A using one or more of antennas 106A-106N. Similarly, base station 100 can communicate with mobile device 103B using one or more of antennas 106A-106N.

Mobile device 103A can communicate with base station 100 using one or more of its antennas 109A-109J. Likewise, mobile device 103B can communicate with base station 100 using one or more of antennas 109A-109J. By using beamforming, base station 100 can direct a transmission beam intended for each of mobile devices 103A and 103B at that particular mobile device and, hence, improve communication with each mobile device.

Furthermore, the use of multiple antennas 109A-109J allows base station 100 to transmit multiple independent streams of data or information to mobile device 103A, mobile device 103B, or both, a technique known as spatial multiplexing. In this scenario, base station 100 uses a pre-coding matrix, P, where the nth column of P forms the beam corresponding to spatial stream n.

Note that, although FIG. 2 shows mobile device 103A and mobile device 103B as having the same number of antennas (i.e., J), the mobile devices may have different number of antennas, as desired. Furthermore, rather than two mobile devices and one base station, the communication system may (and, in many practical applications, does) include multiple base stations, and a relatively large number of mobile devices.

Conventional communication protocols and standards, such as third-generation working group's long-term evolution (3GPP LTE) and WiMAX, adopt a limited feedback approach, where the mobile device feeds back b bits of data to the base station. This mechanism allows selection of a pre-coding matrix, P, from a set of $2^b$ pre-coding matrices, referred to as a codebook.

Apparatus and methods according to the disclosed concepts use multiple codebooks as well as a feedback mechanism. The use of multiple codebooks may help to avoid or reduce deep fade in mobile devices, such as mobile device 103A or mobile device 103B, or both.

Figure 3:
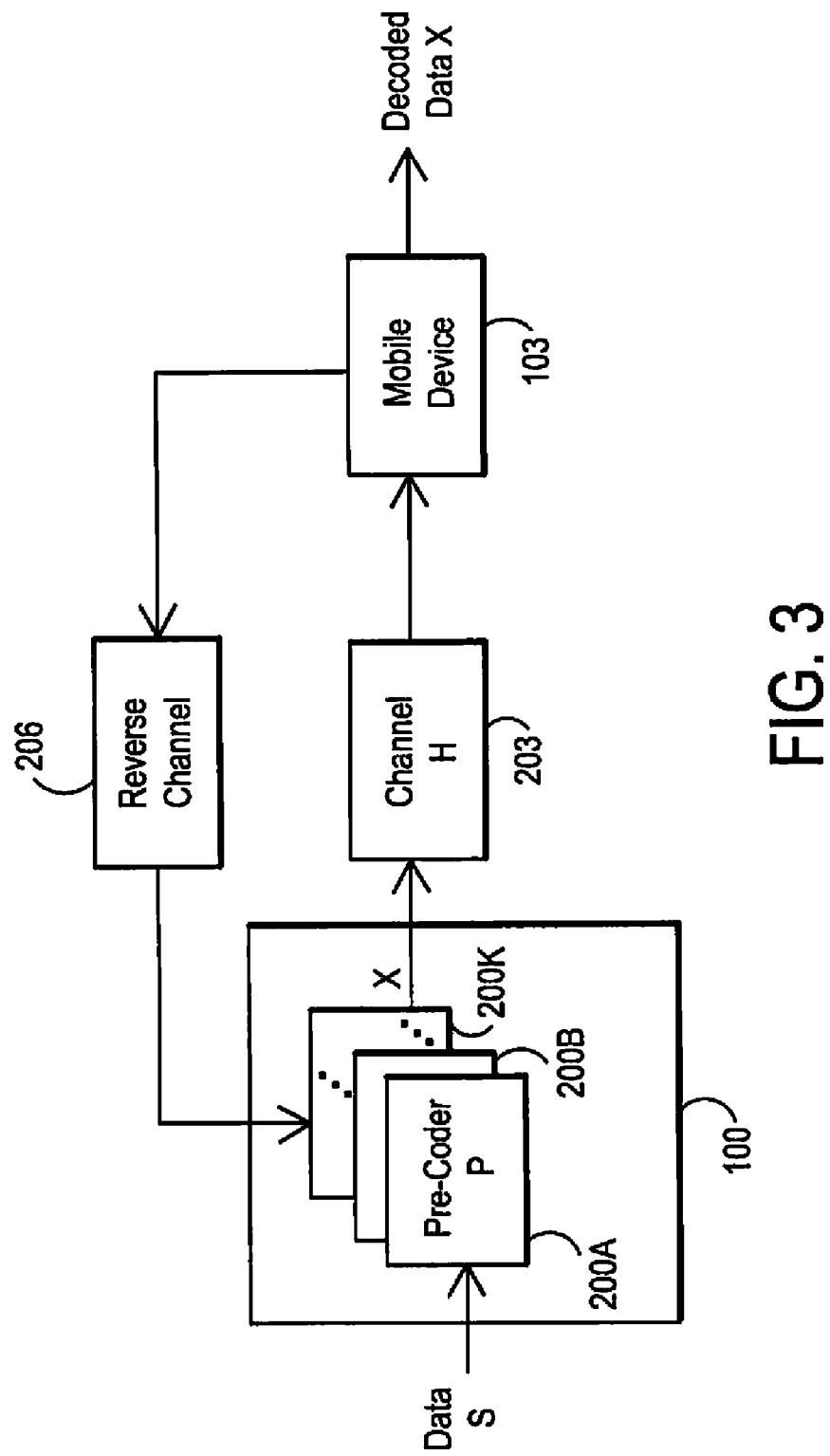
FIG. 3 shows a simplified conceptual block diagram for pre-coding information according to an exemplary embodiment.

FIG. 3 shows a simplified conceptual block diagram for pre-coding information according to an exemplary embodiment. A pre-coder, P, pre-codes data s using a plurality of codebooks denoted as 200A-200K. The pre-coding operation generates a vector x, as described above. Note that the pre-coder generates vector x using information about the communication channel H, as described above.

The transmitter (e.g., the transmitter in base station 100) provides the pre-coded vector x to communication channel 203. The pre-coded vector x, as possibly modified by communication channel 203, arrives at mobile device 103 (or mobile device 103A or 103B, in FIG. 2).

Exemplary embodiments may use feedback regarding the communication channel or one or more codebooks, as shown in FIG. 3. As noted above, to use a given or particular pre-coding vector, base station 100 relies on knowledge of the downlink channel, H, between base station 100 and mobile devices 103A and 103B. One may feed back information about channel 203 to base station 100 via reverse communication channel 206. Base station 100 may use the fed back information to select a pre-coding matrix P that better matches the characteristics of communication channel 203.

Furthermore, in exemplary embodiments one may use a limited feedback approach. Specifically, one may feed back b bits from mobile device 103 to base station 100. Base station 100 then may choose pre-coding matrix P from a codebook that contains a set of $2^b$ pre-coding matrices. The use of limited feedback generally reduces overhead, and might lead to less reduction in the data-rate of the uplink channel. More specifically, by using a primary codebook during transmission, and one or more secondary codebooks during retransmission(s), the complexity of precoding matrix selection and the overhead required for the feedback of the precoding matrix index does not increase with the use of the disclosed concepts compared to conventional single codebook method. Thus, by using the disclosed concepts, one may reduce the outage probability of the system (or mobile device 103) and increase system throughput, with essentially no increases, or relatively small increases, in computation complexity and feedback overhead.

The use of multiple codebooks as described above expands the choices available for pre-coder P. The increase in the number of choices for pre-coder P may help mobile device 103 avoid a deep fade, as described below in detail and as illustrated in the accompanying figures.

Figure 4:
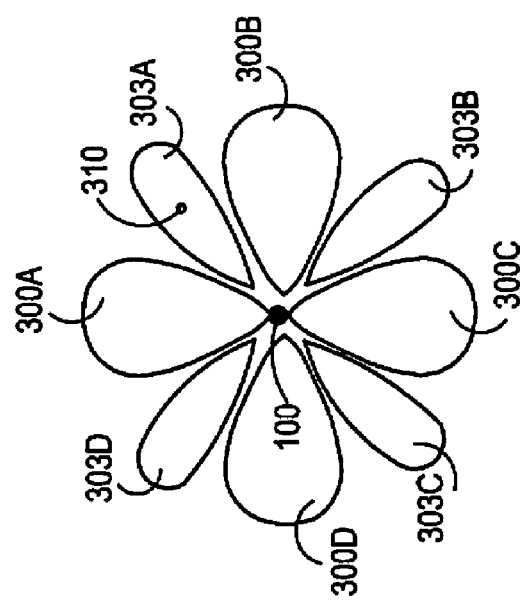
FIG. 4 shows an example of using a plurality of codebooks according to an illustrative embodiment.

FIG. 4 shows an example beam pattern that results from using two codebooks according to an illustrative embodiment. To facilitate presentation of the concepts, one may term the two codebooks as the primary codebook and the secondary codebook. In one embodiment, the primary and secondary codebooks are orthogonal to each other. As noted above, use of a particular pre-coding matrix P (from a desired or given codebook) results in the transmission of a directional beam from base station 100 (from one or more of antennas 106A-106K, generally speaking). The illustration in FIG. 4 shows an exemplary beam pattern that might results from the primary and secondary codebooks.

Specifically, using the primary codebook, base station 100 transmits a signal intended for mobile device 103 (or mobile devices 103A or 103B, or both). The beam pattern of the transmitted signal includes lobes 300A-300D. Furthermore, using the secondary codebook, base station 100 transmits another signal intended for mobile device 103 (or mobile devices 103A or 103B, or both). The beam pattern of this signal includes lobes 303A-303D.

Note that, because of the use of pre-coding, lobes 300A-300D indicate a directional pattern. In other words, mobile device 103 can receive the signal corresponding to lobes 300A-300D if mobile device 103 resides within the area that lobes 300A-300D cover. Similarly, use of pre-coding gives the second transmitted signal a directional pattern. Put another way, mobile device 103 can receive the signal corresponding to lobes 303A-303D if mobile device 103 resides within the area that lobes 303A-303D cover.

As an examination of the beam pattern in FIG. 4 reveals, by using two codebooks, one increases the probability that mobile device 103 falls within the radiation beam patterns of the two transmitted signals. In other words, by using two codebooks, one increases the coverage area of base station 100. As a result, the likelihood that mobile device 103 experiences a deep fade decreases. The use of multiple codebooks therefore can potentially increase the reliability of the communication system, the level of satisfaction of the system's users, and the profitability of the communication network.

In one embodiment, base station 100 may use the primary codebook for transmission of the signal, and the secondary codebook for re-transmission of the signal. In other words, base station 100 transmits the signal intended for mobile device 103 using the primary codebook. If mobile device 103 resides within the beam pattern of the transmitted signal, mobile device 103 should receive the signal without a re-transmission. If, however, mobile device 103 resides outside the coverage area of the beam pattern of the transmitted signal, base station 100 can re-transmit the signal using the secondary codebook.

To illustrate, suppose that mobile device 103 resides at location 310. Base station 100 transmits a signal intended for mobile device 103, using the primary codebook. As illustrated, the beam pattern corresponding to the primary codebook does not cover location 310. Ordinarily, because of its location relative to the beam pattern of the transmitted signal, mobile device 103 cannot receive the transmitted signal. In other words, mobile device 103 experiences a deep fade.

To overcome that situation, base station 100 can re-transmit the signal. Rather than using the primary codebook, however, base station 100 uses the secondary codebook for the re-transmission. As illustrated, location 310 of mobile device 103 falls within the coverage area of the beam pattern corresponding to the secondary codebook. As a result, mobile device 103 can receive the re-transmitted signal, even though mobile device 103 failed to receive the originally transmitted signal.

Note that the use of the above scheme does not result in performance and computational penalties (or any substantial or appreciable penalties) compared to a single-codebook system. Specifically, using the primary and secondary codebooks for transmission and re-transmission, respectively, does not increase (or substantially increase) the complexity of the pre-coding matrix selection and feedback regarding the pre-coding matrix. Thus, using the disclosed concepts one may decrease the probability of reception outage for mobile device 103 and increase system throughput with essentially no increase (or no substantial or appreciable increase) in computational or processing complexity and feedback overhead.

Note that FIG. 4 illustrates merely an exemplary beam pattern. The number and shape of lobes of the transmitted signals might differ from the illustrated numbers and shapes. The number, shape, area of coverage, and other attributes of the beam patterns depend on factors such as the type and configuration of the transmission antenna(s), and the like.

Figure 5:
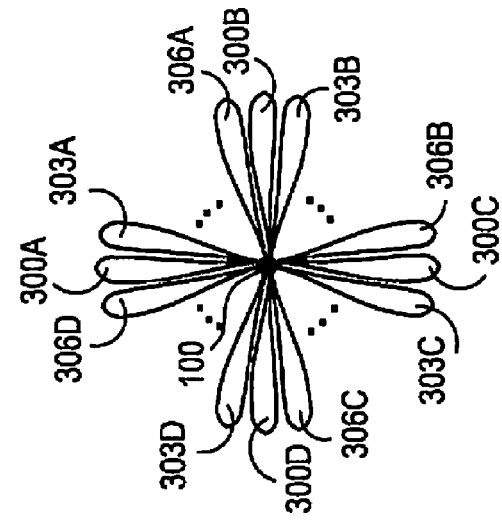
FIG. 5 illustrates an example of using a plurality of codebooks according to another illustrative embodiment.

One may extend the concept described above to the use of more than two codebooks. FIG. 5 illustrates an exemplary beam pattern that corresponds to using a plurality of codebooks, according to an illustrative embodiment.

In one embodiment, base station 100 generally has K codebooks available for use (i.e., codebooks 1 through K, where K denotes a positive integer greater than unity). The codebooks may be orthogonal to one another. As noted above, use of a particular pre-coding matrix P (from a desired or given codebook) results in the transmission of a directional beam from base station 100 (from one or more of antennas 106A-106K, generally speaking). The illustration in FIG. 5 shows an exemplary beam pattern that might results from the primary and secondary codebooks.

Specifically, using one of the codebooks, say, codebook M, where M denotes a positive integer, and M≦K, base station 100 transmits a signal intended for mobile device 103 (or mobile devices 103A or 103B, or both). The beam pattern of the transmitted signal includes lobes 300A-300D. Furthermore, using another codebook, base station 100 transmits another signal intended for mobile device 103 (or mobile devices 103A or 103B, or both). The beam pattern of this signal includes lobes 303A-303D. Base station 100 may repeat this process, as desired. The beam pattern of the last transmitted signal includes lobes 306A-306D.

As described above, the use of pre-coding gives lobes 300A-300D a directional pattern. In other words, mobile device 103 can receive the signal corresponding to lobes 300A-300D if mobile device 103 resides within the area that lobes 300A-300D cover. Similarly, use of pre-coding gives the second transmitted signal a directional pattern. Put another way, mobile device 103 can receive the signal corresponding to lobes 303A-303D if mobile device 103 resides within the area that lobes 303A-303D cover. The same principle holds for the third transmitted signal, and so on, to the last transmitted signal, denoted for example by lobes 306A-306D. Generally, mobile device 103 can receive the signal corresponding to lobes 306A-306D if mobile device 103 resides within the area that lobes 306A-306D cover.

As an examination of the beam pattern in FIG. 5 reveals, by using a plurality of codebooks, one increases the probability that mobile device 103 falls within the radiation beam patterns of the transmitted signals. In other words, by using multiple codebooks, one increases the coverage area of base station 100. As a result, the likelihood that mobile device 103 experiences a deep fade decreases. As noted above, the use of multiple codebooks therefore potentially increases the reliability of the communication system, the level of satisfaction of the system's users, and the profitability of the communication network.

Base station 100 can transmit a signal intended for a mobile device using any of the plurality of codebooks 1-K. In one embodiment, one may use the first codebook for transmission of a signal, and the second through Kth codebooks for re-transmission of the signal if the mobile device does not successfully receive the transmitted signal.

In one embodiment, base station 100 may use one codebook for transmission of the signal, and one or more codebooks for re-transmission of the signal. In other words, base station 100 transmits the signal intended for mobile device 103 using one codebook. If mobile device 103 resides within the beam pattern of the transmitted signal, mobile device 103 should receive the signal without a re-transmission. If, however, mobile device 103 resides outside the coverage area of the beam pattern of the transmitted signal, base station 100 can re-transmit the signal using another codebook. Base station 100 may repeat this process, as desired, until mobile device 103 receives the signal (or until base station 100 exhausts the number of possible codebooks available to base station 100).

In another embodiment, one may use codebooks 1-K for transmission of signals generally (rather than transmission of a signal using one codebook and re-transmission of the signal using one or more codebooks). In other embodiments, one may use a variety of other arrangements.

Generally speaking, using more codebooks increases the probability of successful reception by mobile device 103. A larger number of codebooks, however, may increase the overall system complexity (in some applications), and may entail the passage of a longer time period before mobile device 103 successfully receives the transmitted signal (or base station 100 exhausts the supply of available codebooks). Thus, one may trade off system complexity and/or throughput for system reliability, user satisfaction, network profitability, etc.

Note that FIG. 5 illustrates merely an exemplary beam pattern corresponding to the use of multiple codebooks. The number and shape of lobes of the transmitted signals might differ from the illustrated numbers and shapes. The number, shape, area of coverage, and other attributes of the beam patterns depend on factors such as the type and configuration of the transmission antenna(s), and the like.

As noted above, one may use the disclosed concepts in a variety of communication systems, such as systems that use a protocol with multiple time-slots. FIG. 6 depicts using a plurality of codebooks in multiple time-slots according to an exemplary embodiment. The system can use codebooks 1 through K.

In time-slot 1, the base station (or generally, a transmitter) and the mobile device (or generally, a receiver) use codebook 1 to communicate information from the base station to the mobile device. Subsequently, in time-slot 2, the base station and the mobile device use codebook 2 to communicate. This process repeats a desired number of times, with succeeding time-slots using one of the remaining codebooks. Thus, in time-slot K, the base station and the mobile device use codebook K to communicate. Subsequently, in time-slot K+1, the base station and the mobile device use codebook 1 again, and the process may repeat.

Note that, rather than using codebook 1 in time-slot K+1, one may use another codebook, as desired. Furthermore, one may repeat the codebook usage pattern one or more times, as desired. One may also use the codebooks in any desired order (e.g., 1, 5, 3, etc.), or order the codebooks in a desired manner (e.g., ascending, descending, or some other pattern). One may base the pattern of codebook usage at least in part on the channel information fed back from the mobile device to the base station, as desired. Generally speaking, the base station (transmitter) and mobile device (receiver) may use any pre-defined pattern of codebooks, as desired.

As noted above, one may use the disclosed concepts in communication systems that employ a plurality of frequencies or frequency bands, rather than, or in addition to or in combination with, multiple time-slots. Alternatively, one may use the disclosed concepts in communication systems that use a combination of multiple time-slots and a plurality of frequencies or frequency bands, as desired.

FIG. 7 depicts a diagram of using a plurality of codebooks in conjunction with multiple frequencies according to an exemplary embodiment. The system can use codebooks 1 through K. Without loss of generality, the reference to frequencies (e.g., "frequency 1") applies also to frequency bands, sub-carriers, etc. In one embodiment, the system employs orthogonal frequency division multiplexing (OFDM).

For frequency 1, the base station (or generally, a transmitter) and the mobile device (or generally, a receiver) use codebook 1 to communicate information from the base station to the mobile device. Similarly, for frequency 2, the base station and the mobile device use codebook 2 to communicate. This process repeats a desired number of times for a desired number of frequencies. Thus, for frequency K, the base station and the mobile device use codebook K to communicate. For frequency K+1, the base station and the mobile device use codebook 1 again, and the process may repeat.

The above description assumes that the number of frequencies exceeds the number of codebooks. In practice, that assumption is usually reasonable. If, however, the number of codebooks exceeds the number of frequencies, one may use one of a variety of options. As one example, one may use as many codebooks as the number of frequencies.

Note that, rather than using codebook 1 for frequency K+1, one may use another codebook, as desired. Furthermore, one may repeat the codebook usage pattern one or more times, as desired. One may also use the codebooks in any desired order (e.g., 1, 5, 3, etc.), or order the codebooks in a desired manner (e.g., ascending, descending, or some other pattern). One may base the pattern of codebook usage at least in part on the channel information fed back from the mobile device to the base station, as desired. Generally speaking, the base station (transmitter) and mobile device (receiver) may use any pre-defined pattern of codebooks, as desired.

Figure 8:
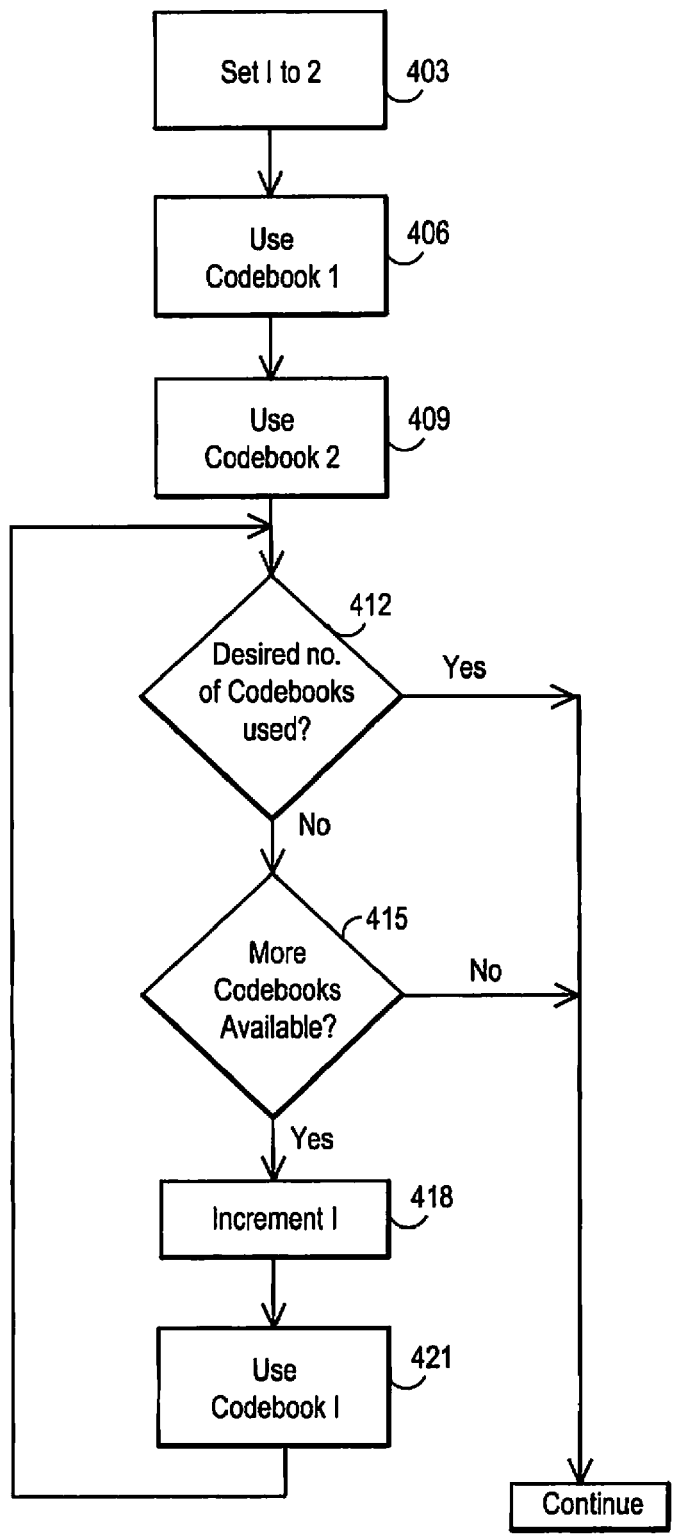
FIG. 8 shows a simplified flow diagram of a method for using a plurality of codebooks according to an illustrative embodiment.

FIG. 8 shows a simplified flow diagram of a method for using a plurality of codebooks according to an illustrative embodiment. At 403, one initializes a counter, I, to 2. At 406, one uses a codebook, say, codebook 1, to communicate information (e.g., from base station 100 to mobile device 103). If desired (e.g., if the receiver or mobile device did not successfully receive the information transmitted from the transmitter or base station), at 409 one may communicate using another codebook, say, codebook 2 (for example, to re-transmit the signal, or transmit another signal, etc.).

At 412, the method determines whether the desired number of codebooks have been used. If so, the method continues to another process or method, as desired. If not, at 415, one determines whether more codebooks are available (e.g., if one has reached the maximum number of codebooks in the system). If no more codebooks are available, the method continues to another process or method, as desired.

On the other hand, if more codebooks are available, at 418, the method increments counter I. At 421, one uses codebook I. One may use the additional codebook to re-transmit information, transmit an additional signal, etc., as noted above. The method then resumes at 412, and repeats until the desired number of codebooks have been used or no more codebooks remain available.

Note that one may use feedback in conjunction with the above method, as desired. Thus, one may employ feedback to determine whether the mobile device received the communication properly, learn of the channel attributes, etc. Furthermore, generally, one may use any pre-defined pattern of codebooks, as desired, and as described above. Finally, note that one may apply the method described above to systems using time-slots, frequencies, frequency bands, etc., or a combination of them, as desired.

Figure 9:
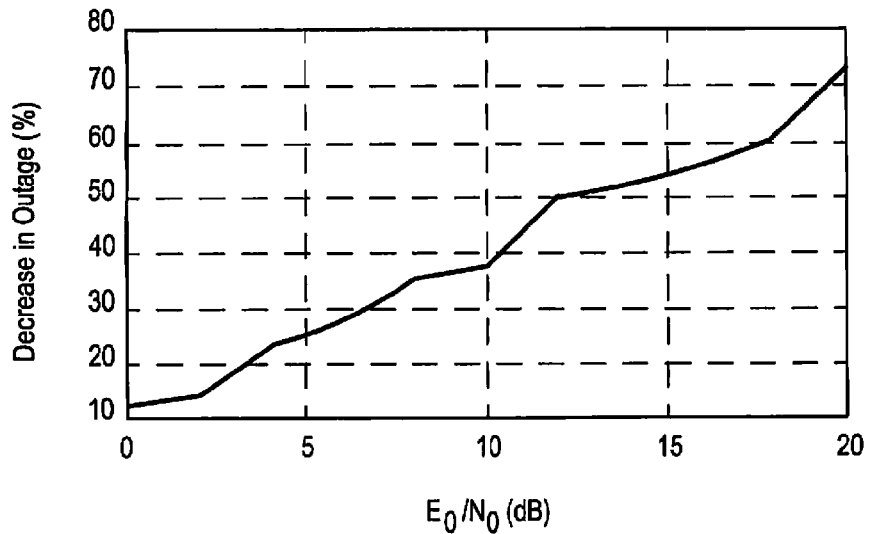
FIG. 9 illustrates a graph of outage probability in a communication apparatus that uses a plurality of codebooks.
Figure 10:
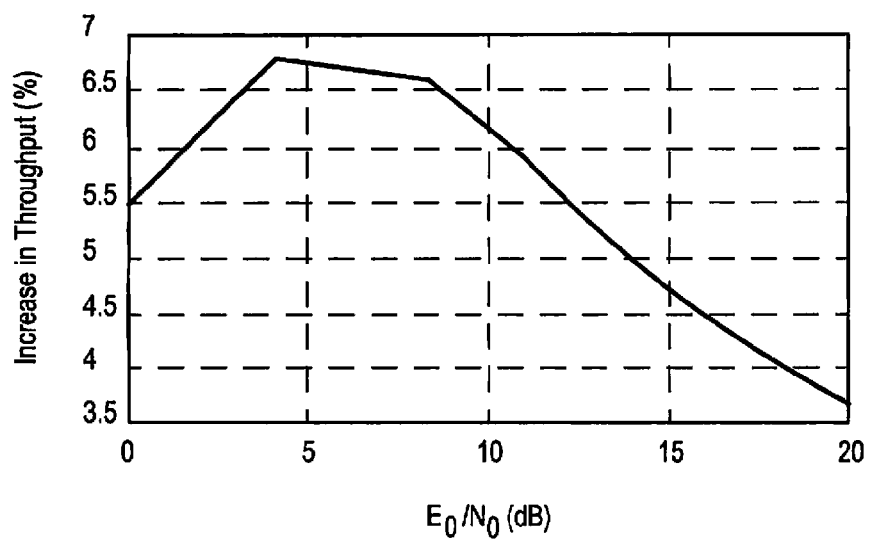
FIG. 10 depicts a graph of the increase in throughput in a communication apparatus that uses a plurality of codebooks.

As noted above, using multiple codebooks, instead of a single codebook, decreases outage probability, and increases throughput. FIGS. 9 and 10 illustrate simulated results for a system that uses two codebooks. FIG. 9 illustrates a graph of outage probability in a communication apparatus that uses a pair of codebooks. Note the decreased outage probability, expressed as a percentage, as a function of the ratio of the transmit energy per bit to noise power spectral density, or $E_0/N_0$. (Note that the ratio $E_0/N_0$ effectively constitutes signal-to-noise ratio (SNR) per bit of information). As the graph in FIG. 9 shows, using multiple codebooks decreases outage probability.

FIG. 10 depicts a graph of the increase in throughput as a function of the ratio of the transmit energy per bit to noise power spectral density ($E_0/N_0$) in a communication apparatus that uses two codebooks. More specifically, the graph in FIG. 10 illustrates the increase in throughput of such a communication system compared to a conventional system. As the graph in FIG. 10 illustrates, using multiple codebooks results in an increase in system throughput over conventional system. Under typical operating conditions ($E_0/N_0$ of about 5 dB), use of multiple codebooks provides a relatively large increase in system throughput and, thus, performance.

One may apply the disclosed concepts effectively to various RF communication systems. Examples described in this document (cellular and WiMAX) constitute merely illustrative applications, and are not intended to limit the application of the disclosed concepts to other communication systems by making appropriate modifications.

Referring to the figures, note that the various blocks shown may depict mainly the conceptual functions and signal flow. The actual circuit implementation may or may not contain separately identifiable hardware for the various functional blocks and may or may not use the particular circuitry shown. For example, one may combine the functionality of various blocks into one circuit block, as desired. Furthermore, one may realize the functionality of a single block in several circuit blocks, as desired. The choice of circuit implementation depends on various factors, such as particular design and performance specifications for a given implementation. Other modifications and alternative embodiments in addition to those described here will be apparent to persons of ordinary skill in the art. Accordingly, this description teaches those skilled in the art the manner of carrying out the disclosed concepts and are to be construed as illustrative only.

The forms and embodiments shown and described should be taken as illustrative embodiments. Persons skilled in the art may make various changes in the shape, size and arrangement of parts without departing from the scope of the disclosure described in this document. For example, one may substitute equivalent elements for the elements illustrated and described here. In addition, certain features of the disclosed concepts may be used independently of the other features without departing from the scope of the disclosed concepts.

The invention claimed is:

1. A system, comprising:
a transmitter configured to transmit information to a remote device,
wherein the transmitter is configured to use a plurality of codebooks to transmit the information,
wherein each of the codebooks includes a set of $2^b$ pre-coding matrices, where b denotes a number of bits of channel information received from the remote device, and
wherein each of the pre-coding matrices determines an angle of departure of a signal from an antenna of the transmitter towards the remote device.

2. The system of claim 1, wherein:
the transmitter is configured to transmit the information using a plurality of time-slots, the plurality of time-slots implementing time division multiple access (TDMA);
the transmitter is configured to use a first codebook to transmit the information in a first time-slot; and
the transmitter is configured to use a second codebook to transmit the information in a second time-slot.

3. The system of claim 1, wherein:
the transmitter is configured to transmit the information using a plurality of frequencies, the plurality of frequencies implementing orthogonal frequency division multiplexing (OFDM);
the transmitter is configured to use a first codebook to transmit the information in a first frequency; and
the transmitter is configured to use a second codebook to transmit the information in a second frequency.

4. The system of claim 1, wherein the transmitter is configured to:
select a first pre-coding matrix from a first codebook to transmit data in a first signal to the remote device during a first transmission, wherein the first pre-coding matrix determines a first angle of departure of the first signal from the antenna of the transmitter towards the remote device during the first transmission, and
select a second pre-coding matrix from a second codebook to retransmit the data in a second signal to the remote device during a second transmission in response to the first signal being not received by the remote device during the first transmission, wherein the second pre-coding matrix determines a second angle of departure of the second signal from the antenna during the second transmission.

5. The system of claim 4, wherein the transmitter is configured to:
multiply the first signal by a first pre-coding vector from the first pre-coding matrix to generate a first transmit vector of length N, where N denotes a number of transmit antennas of the transmitter, and wherein an $N^{th}$ element of the first transmit vector includes a signal transmitted via an $N^{th}$ antenna of the transmitter; and
multiply the second signal by a second pre-coding vector from the second pre-coding matrix to generate a second transmit vector of length N, wherein an $N^{th}$ element of the second transmit vector includes a signal transmitted via the $N^{th}$ antenna of the transmitter.

6. The system of claim 4, wherein the transmitter is configured to select the first pre-coding matrix and the second pre-coding matrix based on the channel information.

7. The system of claim 4, wherein the first codebook and the second codebook are orthogonal to each other.

8. A method for transmitting information to a remote device via a communication channel, the method comprising:
transmitting the information using multiple pre-coding codebooks,
wherein each of the codebooks includes a set of $2^b$ pre-coding matrices, where b denotes a number of bits of channel information received from the remote device, and
wherein each of the pre-coding matrices determines an angle of departure of a signal from an antenna of the transmitter towards the remote device.

9. The method of claim 8, wherein transmitting the information includes:
selecting a first pre-coding matrix from a first codebook to transmit data in a first signal to the remote device during a first transmission;

determining, based on the first pre-coding matrix, a first angle of departure of the first signal from the antenna of the transmitter towards the remote device during the first transmission;

selecting a second pre-coding matrix from a second codebook to retransmit the data in a second signal to the remote device during a second transmission in response to the first signal being not received by the remote device during the first transmission; and determining, based on the second pre-coding matrix, a second angle of departure of the second signal from the antenna during the second transmission.

10. The method of claim 9, further comprising:

multiplying the first signal by a first pre-coding vector from the first pre-coding matrix to generate a first transmit vector of length N, where N denotes a number of transmit antennas of the transmitter, and wherein an $N^{th}$ element of the first transmit vector includes a signal transmitted via an $N^{th}$ antenna of the transmitter; and multiplying the second signal by a second pre-coding vector from the second pre-coding matrix to generate a second transmit vector of length N, wherein an $N^{th}$ element of the second transmit vector includes a signal transmitted via the $N^{th}$ antenna of the transmitter.

11. The method of claim 9, further comprising selecting the first pre-coding matrix and the second pre-coding matrix based on the channel information.

12. The method of claim 9, wherein the first codebook and the second codebook are orthogonal to each other.

13. The method of claim 8, further comprising:

transmitting the information using a plurality of time-slots, the plurality of time-slots implementing time division multiple access (TDMA);

using a first codebook to transmit the information in a first time-slot; and using a second codebook to transmit the information in a second time-slot.

14. The method of claim 8, further comprising:

transmitting the information using a plurality of frequencies, the plurality of frequencies implementing orthogonal frequency division multiplexing (OFDM);

using a first codebook to transmit the information in a first frequency; and using a second codebook to transmit the information in a second frequency.

\* \* \* \* \*